US010879581B2

United States Patent
Wang et al.

(10) Patent No.: US 10,879,581 B2
(45) Date of Patent: Dec. 29, 2020

(54) ELECTRONIC DEVICE

(71) Applicant: Lenovo (Beijing) Co., Ltd., Beijing (CN)

(72) Inventors: Wenlei Wang, Beijing (CN); Zhaowei Hu, Beijing (CN); Xiaozhun Shen, Beijing (CN); Dafei Mo, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 166 days.

(21) Appl. No.: 15/941,578

(22) Filed: Mar. 30, 2018

(65) Prior Publication Data

US 2019/0006747 A1 Jan. 3, 2019

(30) Foreign Application Priority Data

Jun. 30, 2017 (CN) .......................... 2017 1 0524844

(51) Int. Cl.
*H01Q 1/22* (2006.01)
*H01Q 1/24* (2006.01)
*H01Q 9/42* (2006.01)
*H01Q 21/28* (2006.01)

(52) U.S. Cl.
CPC ......... *H01Q 1/2266* (2013.01); *H01Q 1/2291* (2013.01); *H01Q 1/243* (2013.01); *H01Q 9/42* (2013.01); *H01Q 21/28* (2013.01)

(58) Field of Classification Search
CPC .. H01Q 1/2258; H01Q 1/2266; H01Q 1/2291; H01Q 1/24; H01Q 1/241; H01Q 1/243; H01Q 1/523; H01Q 5/321; H01Q 9/16; H01Q 9/42; H01Q 21/28; H01Q 21/30; H04M 1/0283; H04M 1/185
See application file for complete search history.

(56) References Cited

U.S. PATENT DOCUMENTS

| | | | | |
|---|---|---|---|---|
| 6,636,181 | B2 * | 10/2003 | Asano | G06F 1/1616 343/702 |
| 7,813,709 | B2 * | 10/2010 | Yamamoto | H01Q 1/243 343/833 |
| 8,059,040 | B2 * | 11/2011 | Ayala Vazquez | H01Q 1/02 343/700 MS |
| 9,136,590 | B2 * | 9/2015 | Hotta | H01Q 1/243 |
| 9,236,648 | B2 * | 1/2016 | Guterman | H01Q 1/2266 |
| 2001/0040529 | A1 | 11/2001 | Cheng et al. | |
| 2005/0062657 | A1 | 3/2005 | Lin | |

FOREIGN PATENT DOCUMENTS

| | | |
|---|---|---|
| CN | 103904419 A | 7/2014 |
| CN | 204130694 U | 1/2015 |
| CN | 104377435 A | 2/2015 |
| CN | 105206916 A | 12/2015 |
| CN | 105490001 A | 4/2016 |
| CN | 105633545 A | 6/2016 |
| CN | 106450651 A | 2/2017 |

\* cited by examiner

*Primary Examiner* — Dimary S Lopez-Cruz
*Assistant Examiner* — Patrick R Holecek
(74) *Attorney, Agent, or Firm* — Anova Law Group, PLLC

(57) ABSTRACT

An electronic device includes a first body, a second body, and a rotating shaft structure connected to the first body and the second body. The rotating shaft structure includes a first shaft and a second shaft arranged opposite to each other and fixedly connected to the first body and the second body. The rotating shaft structure further includes an antenna radiator including a plurality of metal shafts electrically coupled to each other and provided in an interspace between the first shaft and the second shaft.

11 Claims, 2 Drawing Sheets

ELECTRONIC DEVICE

CROSS-REFERENCE TO RELATED APPLICATION

This application claims priority to Chinese Application No. 201710524844.X, filed on Jun. 30, 2017, the entire contents of which are incorporated herein by reference.

FIELD OF THE DISCLOSURE

The present disclosure relates to antenna technology and, more particularly, to an electronic device having an antenna.

BACKGROUND

With the development of electronic technology, electronic devices with all-metal shell are becoming more and more popular due to the good-looking appearance and the good quality, which have gradually become the trend of the design of wireless electronic devices. However, an all-metal shell causes a shielding effect on the antenna radiation of the electronic device, which leads to a narrow bandwidth of the antenna and deteriorates the performance of the antenna, such that the performance requirement of a Long Term Evolution (LTE) antenna of the electronic device cannot be satisfied.

A groove or a slit is commonly provided on the metal shell of conventional electronic devices to form an antenna radiator, which affects the overall strength and appearance of the electronic devices and increases the production cost.

SUMMARY

In accordance with the disclosure, there is provided an electronic device including a first body, a second body, and a rotating shaft structure connected to the first body and the second body. The rotating shaft structure includes a first shaft and a second shaft arranged opposite to each other and fixedly connected to the first body and the second body. The rotating shaft structure further includes an antenna radiator including a plurality of metal shafts electrically coupled to each other and provided in an interspace between the first shaft and the second shaft.

BRIEF DESCRIPTION OF THE DRAWINGS

The following drawings merely illustrate embodiments of the present disclosure. Other drawings may be obtained based on the disclosed drawings by those skilled in the art without creative efforts.

DETAILED DESCRIPTION

Hereinafter, embodiments of the present disclosure are described with reference to the drawings. It is apparent that the disclosed embodiments are merely some but not all of embodiments of the present disclosure. Other embodiments of the disclosure may be obtained based on the embodiments disclosed herein by those skilled in the art without creative efforts, which are intended to be within the scope of the disclosure.

The present disclosure may be implemented in other manners not described herein. One of ordinary skill in the art can use different manners to implement the described functions for different application scenarios, but such implementations should not be considered as beyond the scope of the present disclosure. The scope of the disclosure is not limited by the disclosed embodiments.

Figure 1:
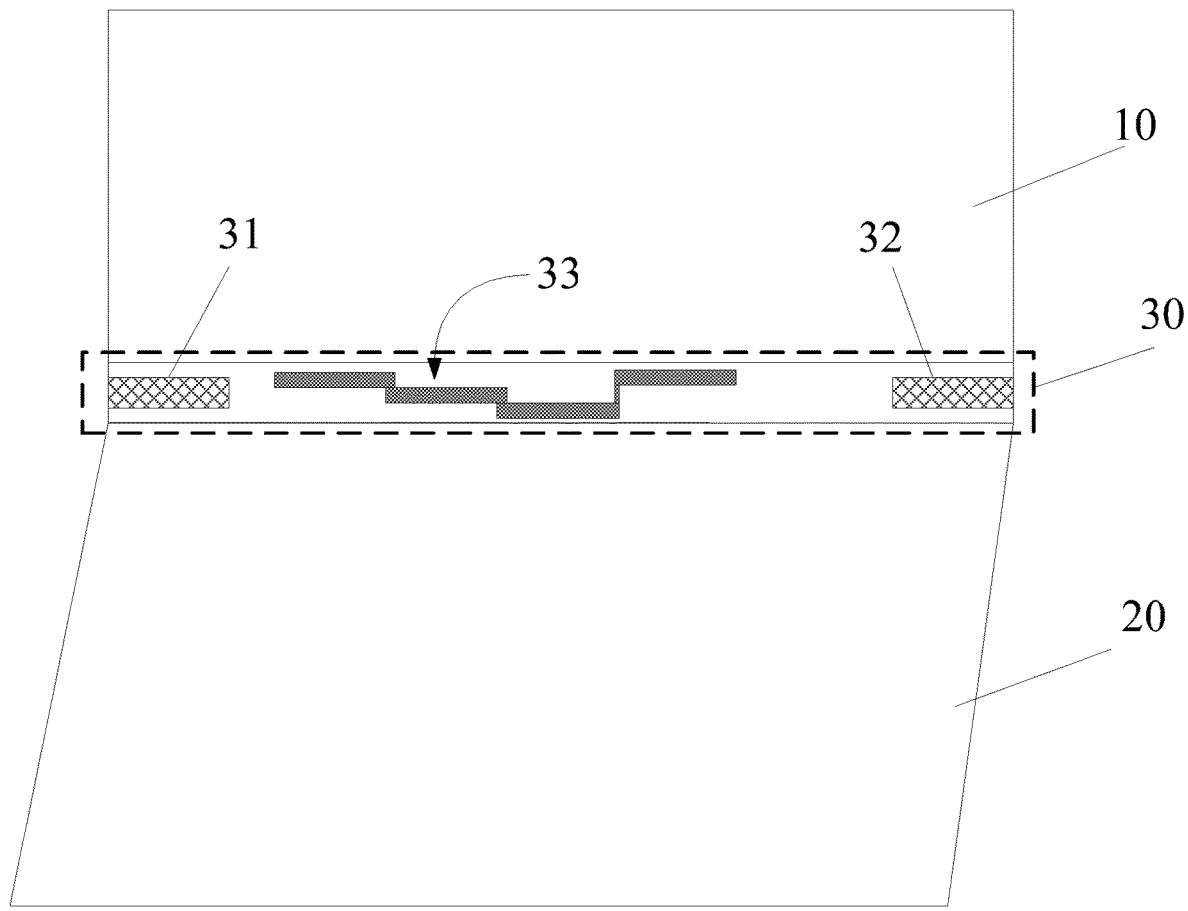
FIG. 1 is a schematic structure diagram of an electronic device according to the disclosure.

FIG. 1 is a schematic structure diagram of an electronic device 100 consistent with the disclosure. As shown in FIG. 1, the electronic device 100 includes a first body 10, a second body 20, and a rotating shaft structure 30 connected to both the first body 10 and the second body 20. The rotating shaft structure 30 includes a first shaft 31 and a second shaft 32 arranged opposite to each other. The first shaft 31 and the second shaft 32 are fixedly connected to the first body 10 and the second body 20. A plurality of first metal shafts 33 electrically coupled to each other are provided in an interspace between the first shaft 31 and the second shaft 32, and form a first antenna radiator of the electronic device 100.

In some embodiments, the first body 10 and the second body 20 can be rotated around the first shaft 31 and the second shaft 32, such that the first body 10 and the second body 20 can be at different opening and closing angles by being rotated around the first shaft 31 and the second shaft 32. Taking a laptop as an example of the electronic device 100, the first body 31 can include a display screen and the second body 32 can include a device body. The first body 31 and the second body 32 can be determined according to different application scenarios. The disclosure is not limited thereto.

According to the present disclosure, the first antenna radiator is formed by the plurality of first metal shafts 33 electrically coupled to each other that are provided in the interspace between the first shaft 31 and the second shaft 32 of the electronic device 100. This configuration enhances the overall strength and appearance of the electronic device 100 and reduces the production cost. In addition, the plurality of first metal shafts 33 forming the first antenna radiator are provided in the rotating shaft structure 30. That is, the plurality of first metal shafts 33 are provided in a connecting area between the first body 10 and the second body 20. Therefore, even though the first body 10 and the second body 20 use all-metal shells and no matter how the first body 10 and the second body 20 rotate around the first shaft 31 and the second shaft 32, the performance of the first antenna radiator would not be affected.

In some embodiments, the first antenna radiator can include, but is not limited to, a planar inverted-F antenna (PIFA), an inverted-F antenna (IFA), or a loop antenna. The first antenna radiator can be selected according to different application scenarios. The disclosure is not limited thereto.

In some embodiments, an effective length of the plurality of first metal shafts 33 after being electrically coupled to each other can be one-half of a preset wavelength within a wavelength range of an antenna signal to be received, e.g., by the first antenna radiator. This wavelength range is also referred to as a working wavelength range of the first antenna radiator. The effective length refers to a length over which the antenna signal is inputted from one end of the plurality of first metal shafts 33 that are electrically coupled to each other and outputted from another end of the plurality of first metal shafts 33. In some embodiments, the effective length is one-half of a center wavelength within the wavelength range of the antenna signal to be received. In some other embodiments, the effective length is one-half of a wavelength within the wavelength range of the antenna signal to be received other than the center wavelength. The disclosure is not limited thereto.

In some embodiments, the plurality of first metal shafts 33 can have a same length or different lengths, and can also be arranged in or not in a straight line, as long as the effective length of the plurality of first metal shafts 33 after being electrically coupled to each other is one-half of the preset wavelength within the wavelength range of the antenna signal to be received. The disclosure is not limited thereto.

In some embodiments, the effective length of the plurality of first metal shafts 33 after being electrically coupled to each other can be adjusted by adjusting at least a position of electrical connection between two adjacent first metal shafts 33. Adjusting the effective length of the plurality of first metal shafts 33 can adjust a frequency range of the antenna signal that can be received by the first antenna radiator formed by the plurality of first metal shafts 33. The relation between the wavelength and frequency of the antenna signal is that the wavelength of the antenna signal equals the speed of light divided by the frequency of the antenna signal. That is, each wavelength of the antenna signal has a corresponding frequency of the antenna signal. In some other embodiments, the effective length of the plurality of first metal shafts 33 after being electrically coupled to each other can be adjusted by adjusting at least a length of one of the plurality of first metal shafts 33. In some other embodiments, the effective length of the plurality of first metal shafts 33 after being electrically coupled to each other can be adjusted by adjusting at least the position of electrical connection between two adjacent first metal shafts 33 and at least the length of one of the plurality of first metal shafts 33. The disclosure is not limited thereto.

Figure 2:
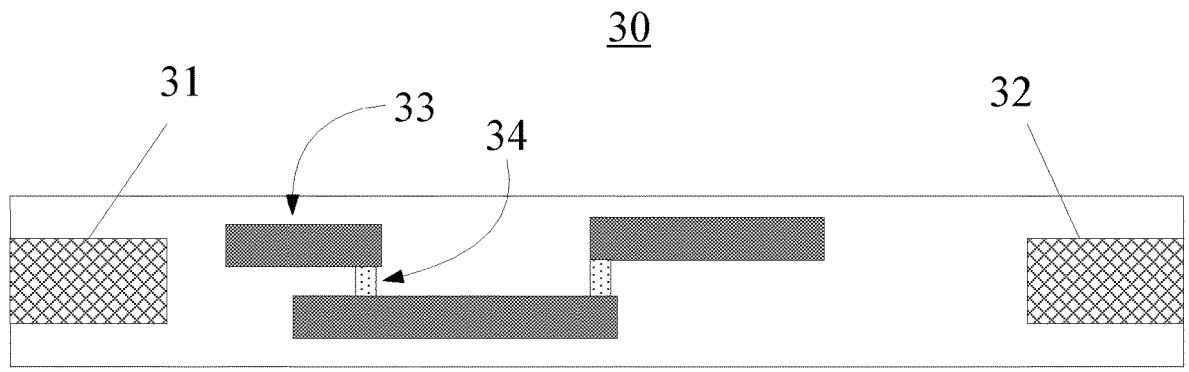
FIG. 2 schematically shows an example of a rotating shaft structure of the electronic device according to the disclosure.

FIG. 2 schematically shows an example of the rotating shaft structure 30 of the electronic device 100 consistent with the disclosure. As shown in FIG. 2, adjacent first metal shafts 33 are electrically coupled to each other by a plurality of first electrical connection structures 34. In some embodiments, the effective length of the plurality of first metal shafts 33 after being electrically coupled to each other can be adjusted by adjusting at least a position of an electrical connection between one of the plurality of first electrical connection structures 34 and one of the plurality of first metal shafts 33 connected thereto.

In some embodiments, an antenna-tuning component can be provided between at least one of the plurality of first electrical connection structure 34 and one of the plurality of first metal shafts 33 connected thereto. The antenna-tuning component can be configured to adjust the frequency range of the antenna signal that can be received by the first antenna radiator formed by the plurality of first metal shafts 33.

In some embodiments, the antenna-tuning component can include, for example, an antenna switch, an adjustable capacitance, an adjustable inductance, or the like. The antenna-tuning component can be selected according to different application scenarios. The disclosure is not limited thereto.

Figure 3:
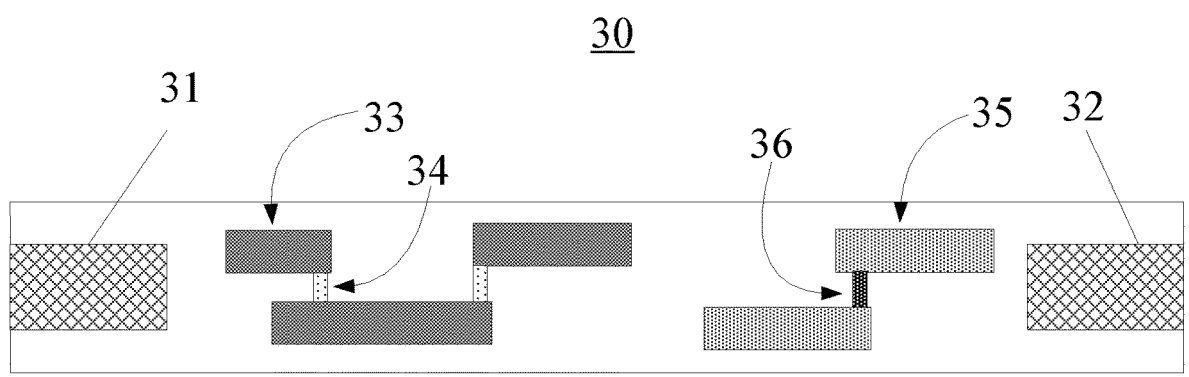
FIG. 3 schematically shows another example of the rotating shaft structure of the electronic device according to the disclosure.

FIG. 3 schematically shows another example of the rotating shaft structure 30 of the electronic device 100 consistent with the disclosure. As shown in FIG. 3, the electronic device 100 further includes a plurality of second metal shafts 35 electrically coupled to each other. The plurality of second metal shafts 35 are provided in the interspace between the first shaft 31 and the second shaft 32, and form a second antenna radiator of the electronic device 100. The frequency ranges of antenna signals received by the second antenna radiator and the first antenna radiator may be not completely the same.

In some embodiments, the second antenna radiator can include, but is not limited to, a planar inverted-F antenna (PIFA), an inverted-F antenna (IFA), or a loop antenna. The second antenna radiator can be selected according to different application scenario. The disclosure is not limited thereto.

In some embodiments, an effective length of the plurality of second metal shafts 35 after being electrically coupled to each other can be one-half of a preset wavelength within a wavelength range of an antenna signal to be received, e.g., by the second antenna radiator. This wavelength range is also referred to as a working wavelength range of the second antenna radiator. In some embodiments, the plurality of second metal shafts 35 can have a same length or different lengths, and can be arranged in or not in a straight line, as long as the effective length of the plurality of second metal shafts 35 after being electrically coupled to each other is one-half of the preset wavelength within the wavelength range of the antenna signal to be received by the second antenna radiator. The disclosure is not limited thereto.

In some embodiments, the effective length of the plurality of second metal shafts 35 after being electrically coupled to each other can be adjusted by adjusting at least a position of electrical connection between two adjacent second metal shafts 35. Adjusting the effective length of the plurality of second metal shafts 35 can adjust the frequency range of the antenna signal that can be received by the second antenna radiator formed by the plurality of second metal shafts 35. In some other embodiments, the effective length of the plurality of second metal shafts 35 after being electrically coupled to each other can be adjusted by adjusting at least a length of one of the plurality of second metal shafts 35. In some other embodiments, the effective length of the plurality of second metal shafts 35 after being electrically coupled to each other can be adjusted by adjusting at least the position of electrical connection between two adjacent second metal shafts 35 and at least the length of one of the plurality of second metal shafts 35. The disclosure is not limited thereto.

In some embodiments, as shown in FIG. 3, adjacent second metal shafts 35 are electrically coupled to each other by a plurality of second electrical connection structures 36. In some embodiments, the effective length of the plurality of second metal shafts 35 after being electrically coupled to each other can be adjusted by adjusting at least a position of an electrical connection between one of the plurality of second electrical connection structures 36 and one of the plurality of second metal shafts 35 connected thereto.

In some embodiments, an antenna-tuning component can be provided between at least one of the plurality of second electrical connection structure 36 and one of the plurality of second metal shafts 35 connected thereto. The antenna-tuning component can be configured to adjust the frequency range of the antenna signal that can be received by the second antenna radiator formed by the plurality of second metal shafts 35.

In some embodiments, the antenna-tuning component can include, for example, an antenna switch, an adjustable capacitance, an adjustable inductance, or the like. The antenna-tuning component can be selected according to different application scenarios. The disclosure is not limited thereto.

According to the present disclosure, the second antenna radiator is formed by the plurality of second metal shafts 35 electrically coupled to each other that are provided in the interspace between the first shaft 31 and the second shaft 32 of the electronic device 100. This configuration enhances the overall strength and appearance of the electronic device 100 and reduces the production cost. In addition, the plurality of second metal shafts 35 forming the second antenna radiator are provided in the rotating shaft structure 30. That is, the plurality of second metal shafts 35 are provided in a connecting area between the first body 10 and the second body 20. Therefore, even though the first body 10 and the second body 20 use all-metal shells and no matter how the first body 10 and the second body 20 rotate around the first shaft 31 and the second shaft 32, the performance of the second antenna radiator would not be affected.

In some embodiments, the first antenna radiator can include an LTE antenna, and the second antenna radiator can include a wireless fidelity (WIFI) antenna. The first antenna radiator and the second antenna radiator can be determined according to different application scenarios. The disclosure is not limited thereto.

In some embodiments, the first shaft 31, the second shaft 32, and/or the plurality of first metal shafts 33 are provided with a protective cover thereon. In some embodiments, the protective cover can include a plastic cover. The protective cover can be selected according to different application scenarios. The disclosure is not limited thereto.

Further, the first antenna radiator can be formed by the plurality of first metal shafts 33 electrically coupled to each other that are provided in the interspace between the first shaft 31 and the second shaft 32 of the electronic device 100. This configuration enhances the overall strength and appearance of the electronic device 100 and reduces the production cost. In addition, the plurality of first metal shafts 33 forming the first antenna radiator are provided in the rotating shaft structure 30. That is, the plurality of first metal shafts 33 are provided in a connecting area between the first body 10 and the second body 20. Therefore, even though the first body 10 and the second body 20 use all-metal shells and no matter how the first body 10 and the second body 20 rotate around the first shaft 31 and the second shaft 32, the performance of the first antenna radiator would not be affected.

In the present disclosure, the embodiments are described in a gradual and progressive manner with the emphasis of each embodiment on an aspect different from other embodiments. For the same or similar parts between the various embodiments, reference may be made to each other.

The foregoing description of the disclosed embodiments will enable a person skilled in the art to realize or use the present disclosure. Various modifications to the embodiments will be apparent to those skilled in the art. The general principles defined herein may be implemented in other embodiments without departing from the spirit or scope of the disclosure. Accordingly, the disclosure will not be limited to the embodiments shown herein, but is to meet the broadest scope consistent with the principles and novel features disclosed herein.

What is claimed is:

1. An electronic device comprising:
   a first body;
   a second body; and
   a rotating shaft structure connected to the first body and the second body, wherein the rotating shaft structure includes:
   a first shaft and a second shaft arranged opposite to each other and fixedly connected to the first body and the second body;
   an antenna radiator including a plurality of metal shafts electrically coupled to each other and provided in an interspace between the first shaft and the second shaft and between the first body and the second body; and
   one or more electrical connection structures, each of the one or more electrical connection structures being disposed directly between and electrically connecting two adjacent ones of the metal shafts,
   wherein:
   the one or more electrical connection structures are arranged in the interspace,
   the two adjacent ones of the metal shafts are arranged along different lines, and
   an effective length of the plurality of metal shafts is determined according to a number of the one or more electrical connection structures and a position of one of the one or more electrical connection structures connecting the two adjacent ones of the metal shafts, thereby adjusting a frequency range of an antenna signal received by the antenna radiator formed by the plurality of metal shafts.

2. The device according to claim 1, wherein:
an effective length of the plurality of metal shafts is one-half of a preset wavelength within a working wavelength range of the antenna radiator.

3. The device according to claim 1, further comprising:
an antenna-tuning component provided between at least one of the one or more electrical connection structures and at least one of the plurality of metal shafts connected to the at least one of the one or more electrical connection structures.

4. The device according to claim 3, wherein:
the antenna-tuning component is selected from the group consisting of an antenna switch, an adjustable capacitance, and an adjustable inductance.

5. The device according to claim 1, wherein:
the metal shafts are first metal shafts and the antenna radiator is a first antenna radiator, and
the rotating shaft structure further includes:
   a second antenna radiator including a plurality of second metal shafts electrically coupled to each other and provided in the interspace between the first shaft and the second shaft.

6. The device according to claim 5, wherein:
an effective length of the plurality of second metal shafts is one-half of a preset wavelength within a working wavelength range of the second antenna radiator.

7. The device according to claim 5, wherein:
the one or more electrical connection structures are one or more first electrical connection structures, and
the rotating shaft structure further includes:
   one or more second electrical connection structures, each of the one or more second electrical connection structures electrically connecting two adjacent ones of the second metal shafts.

8. The device according to claim 7, further comprising:
an antenna-tuning component provided between at least one of the one or more second electrical connection structures and at least one of the plurality of second metal shafts connected to the at least one of the one or more second electrical connection structures.

9. The device according to claim 5, wherein:
the first antenna radiator includes a Long Term Evolution (LTE) antenna and the second antenna radiator includes a wireless fidelity (WIFI) antenna.

10. The device according to claim 1, wherein:
the effective length of the plurality of metal shafts after being electrically coupled to each other is adjusted by adjusting at least a position of an electrical connection between one of the one or more electrical connection structures and one of the plurality of metal shafts connected to the one of the one or more electrical connection structures.

11. The device according to claim 1, wherein:

each of the plurality of metal shafts includes a same length.

* * * * *